R. GILLASPIE.

Seed-Planter.

No. 52,989.

Patented Mar. 6, 1866.

Witnesses
Isaac Watson
William Henry

Inventor
Richard Gillaspie

UNITED STATES PATENT OFFICE.

RICHARD GILLASPIE, OF NEW RICHMOND, OHIO.

IMPROVEMENT IN SEED-PLANTERS.

Specification forming part of Letters Patent No. 52,989, dated March 6, 1866.

*To all whom it may concern:*

Be it known that I, RICHARD GILLASPIE, of New Richmond, in the county of Cleremont and State of Ohio, have invented a new and useful Improvement in Seed-Planters; and I do hereby declare the following to be a full, clear, and exact description, the drawings herewith, and letters of reference marked thereon, being included and forming part of this specification.

My improvements relate to the class of implements which are designed to plant or drop the seed in "check-rows," and the construction of my improved implement is such that the attendant is enabled to drop the seed at the precise point where it is required to coincide with the hills of adjacent rows, also to see the falling seed and know that the apparatus is working properly; and the implement is supplied with a coverer which returns a suitable portion of the earth to cover the seed and secure the conditions for germination. Moreover, the parts which constitute the seeding device are so constructed that they may be conveniently applied to an ordinary farm-plow, transforming the same readily into a superior check-row planter.

I will now proceed to describe my improved planter by reference to the accompanying drawings, in which—

Figure 1:
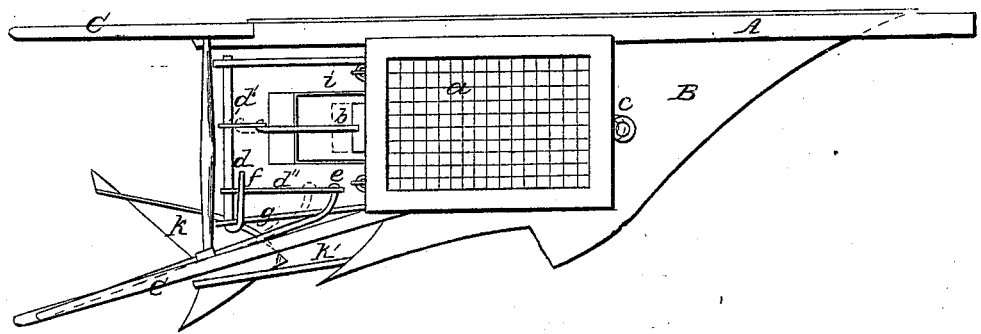
Figure 2:
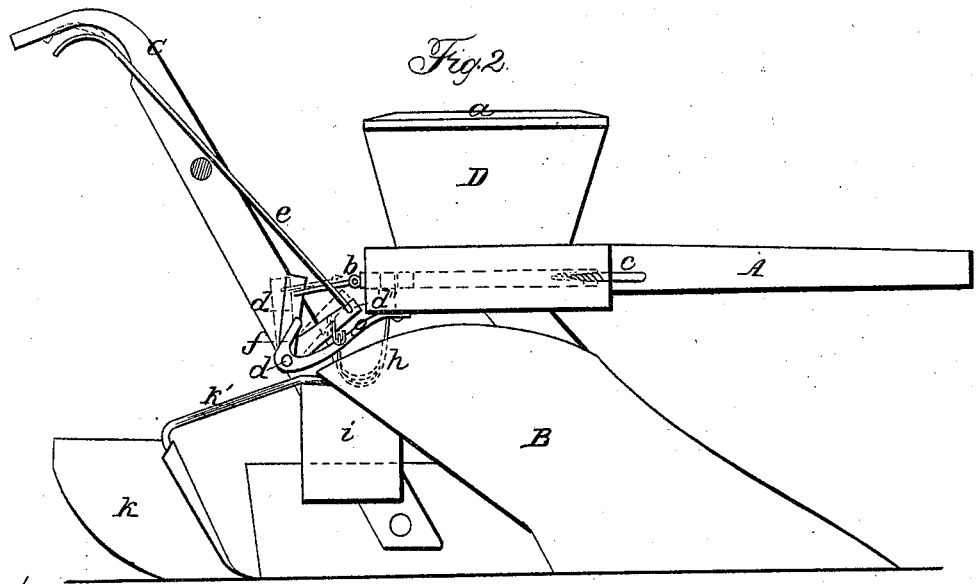

Figure 1 represents a plan, and Fig. 2 an elevation, of the implement.

In this apparatus an ordinary plow in all its parts is represented.

A is the plow-beam; B, the mold-board, and C C the handles.

D is a seed-box secured appropriately to the plow-beam, and made with cover of wire screen $a$. In the bottom of the seed-box a slide, $b$, is arranged, having an aperture through it, which forms a cell for seed. This aperture or cell may be enlarged or diminished by the temper-screw $c$. (Shown at the front end of seed-box.)

$d$ is a double-armed crank. One arm, $d'$, is connected by a link with the seed-slide $b$, and the other arm, $d''$, receives a rod, $e$, which extends up along one of the handles, C, and is bent at the upper to correspond with the bend at the hand end of the handle C, the arrangement being such that the operator, by contracting his gripe upon the handle, can operate this rod $e$ sufficient to communicate motion through its crank-connections to the seed-slide $b$, withdrawing it a short distance rearward from the seed-box. Now, the aperture for seed in the seed-slide is so placed that when the latter is withdrawn a slight distance from the seed-box the aperture comes over the trench left by the turning of the furrow and the contained seed is free to fall to the ground.

$f$ is a stop formed upon one of the brackets or arms $g$, which carry the crank-shaft $d$. This limits the motion of the slide $b$.

$h$ is a spring which causes the slide, when released by the hand of the operator, to return an appropriate distance into the seed-box, where the seed-aperture before mentioned becomes filled with seed, ready to be again withdrawn from the box and dropped appropriately to the ground.

$i$ is a spout or conduit, through which the seed falls from the cell in slide to the ground. This is large and set well back, leaving an opening in the upper end, through which the operator can observe the falling seed and detect any failure or irregularity in the operation of dropping.

$k$ is the coverer, a light mold-board, supported by an arm, $k'$, which is secured to one of the handles C by a socket, which permits the coverer to be set to any appropriate depth. This coverer follows along upon the line of the newly-turned furrow, and returns an appropriate amount of earth into the trench to cover the seed, the depth being regulated, as before mentioned, by the set given to the coverer.

The operation of my improved implement will be sufficiently apparent from the description which has been given of its various parts.

Having therefore fully explained my improvement in seed-planters, what I claim as my invention, and desire to secure by Letters Patent of the United States, is the following:

The seed-box D, double-armed crank $d$, rod $e$, stop $f$, spring $h$, adjustable coverer $k$, the whole constructed and arranged in combination with a plow, substantially as and for the purpose herein specified.

RICHARD GILLASPIE.

Witnesses:
C. W. SHORT,
JOHN MCDONALD.